(12) United States Patent
Kariya et al.

(10) Patent No.: US 12,103,100 B2
(45) Date of Patent: Oct. 1, 2024

(54) METHOD FOR MANUFACTURING SHAFT

(71) Applicant: SANJO MACHINE WORKS, LTD., Sanjo (JP)

(72) Inventors: Hiroyuki Kariya, Sanjo (JP); Takahiro Sekine, Sanjo (JP); Fumihiko Hattori, Sanjo (JP); Kazushi Goi, Sanjo (JP); Ryo Kurosawa, Sanjo (JP)

(73) Assignee: SANJO MACHINE WORKS, LTD., Sanjo (JP)

( * ) Notice: Subject to any disclaimer, the term of this patent is extended or adjusted under 35 U.S.C. 154(b) by 0 days.

(21) Appl. No.: 17/777,109

(22) PCT Filed: Sep. 27, 2021

(86) PCT No.: PCT/JP2021/035285
§ 371 (c)(1),
(2) Date: May 16, 2022

(87) PCT Pub. No.: WO2022/259567
PCT Pub. Date: Dec. 15, 2022

(65) Prior Publication Data
US 2024/0157465 A1 May 16, 2024

(30) Foreign Application Priority Data
Jun. 11, 2021 (JP) ................ 2021-098248

(51) Int. Cl.
*B23K 20/00* (2006.01)
*B23K 20/02* (2006.01)
*B23K 101/06* (2006.01)

(52) U.S. Cl.
CPC .......... *B23K 20/023* (2013.01); *B23K 20/002* (2013.01); *B23K 2101/06* (2018.08)

(58) Field of Classification Search
CPC .... B23K 2101/06; B23K 20/12; B23K 33/00; B23K 20/02; B23K 20/021; B23K 20/023; B23K 2101/04
See application file for complete search history.

(56) References Cited

U.S. PATENT DOCUMENTS 6,419,147 B1 * 7/2002 Daniel ................ B23K 20/023
228/193
6,860,420 B2 * 3/2005 Filippov ................ B23K 20/16
228/246

(Continued)

FOREIGN PATENT DOCUMENTS

JP 09-300084 A 11/1997
JP 10-002321 A 1/1998

(Continued)

OTHER PUBLICATIONS

International Search Report of PCT/JP2021/035285 dated Dec. 7, 2021 [PCT/ISA/210].

(Continued)

*Primary Examiner* — Erin B Saad
(74) *Attorney, Agent, or Firm* — Sughrue Mion, PLLC

(57) ABSTRACT

A method for manufacturing a shaft, whereby a hollow shaft in which linking members are joined at both ends of a cylindrical member (a pipe member) can be manufactured more efficiently. A method for manufacturing a shaft in which linking members are provided to end parts of a cylindrical member, wherein the method comprises: a preparation step for preparing the cylindrical member, in which male threaded portions are formed at the end parts; a screwing step in which the linking members, which have female threaded portions to be screwed onto the male threaded portions, are screwed onto the male threaded portions; and a diffusion-joining step in which opposing end surfaces of the linking members and the cylindrical member (Continued)

are heated in a state of being pressed against each other by the tightening produced by the screwed-on linking members, and the opposing end surfaces are diffusion-joined.

2 Claims, 4 Drawing Sheets

(56) References Cited

U.S. PATENT DOCUMENTS

| | | | | |
|---|---|---|---|---|
| 6,976,541 B2* | 12/2005 | Brisco | ............... | E21B 34/14 |
| | | | | 166/207 |
| 7,021,390 B2* | 4/2006 | Cook | ............... | E21B 43/106 |
| | | | | 166/380 |
| 7,055,608 B2* | 6/2006 | Cook | ............... | E21B 29/10 |
| | | | | 166/380 |
| 7,100,697 B2* | 9/2006 | Haugen | ............... | B23D 79/021 |
| | | | | 166/380 |
| 7,424,918 B2* | 9/2008 | Shuster | ............... | E21B 17/08 |
| | | | | 166/207 |
| 2011/0017589 A1* | 1/2011 | Goodwin | ............... | C23F 13/18 |
| | | | | 204/286.1 |
| 2012/0129613 A1* | 5/2012 | Milligan | ............... | F41B 15/025 |
| | | | | 463/47.7 |
| 2014/0160742 A1* | 6/2014 | Rodgers | ............... | F21K 9/62 |
| | | | | 29/401.1 |
| 2016/0208492 A1* | 7/2016 | Kim | ............... | E04C 5/165 |
| 2019/0056045 A1* | 2/2019 | Dougherty | ............... | F16L 9/00 |
| 2019/0178329 A1* | 6/2019 | Dumitru | ............... | B60G 17/08 |
| 2020/0114464 A1* | 4/2020 | Nagai | ............... | B23K 20/12 |
| 2020/0254840 A1* | 8/2020 | Rositch | ............... | B60G 3/01 |
| 2021/0346978 A1* | 11/2021 | Nagai | ............... | B23K 20/12 |

FOREIGN PATENT DOCUMENTS

| | | |
|---|---|---|
| JP | 11-063853 A | 3/1999 |
| JP | 11-090656 A | 4/1999 |
| JP | 11-333572 A | 12/1999 |
| JP | 2006-258236 A | 9/2006 |

OTHER PUBLICATIONS

Written Opinion of PCT/JP2021/035285 dated Dec. 7, 2021 [PCT/ISA/237].

Office Action dated Sep. 8, 2022 issued in Japanese Application No. 2021-098248.

* cited by examiner

METHOD FOR MANUFACTURING SHAFT

CROSS REFERENCE TO RELATED APPLICATIONS

This application is a National Stage of International Application No. PCT/JP2021/035285 filed on Sep. 27, 2021, claiming priority based on Japanese Patent Application No. 2021-098248 filed on Jun. 11, 2021.

TECHNICAL FIELD

The present invention relates to a method for manufacturing a shaft.

BACKGROUND ART

Hollow shafts in which linking members provided with gears and splines are joined by friction welding at both ends of a ready-made pipe member are at times used as shafts for motors, etc. (see Patent Document 1). Such hollow shafts are often employed when there is a strong need to reduce weight; e.g., with shafts in motors for electric vehicles (EVs).

PRIOR ART DOCUMENTS

Patent Document

[Patent Document 1] Japanese Laid-open Patent Application No. 2006-258236

SUMMARY OF THE INVENTION

Problems the Invention is Intended to Solve

An object of the present invention is to provide an unprecedented method for manufacturing a shaft, whereby a hollow shaft in which linking members are joined at both ends of a cylindrical member (a pipe member) can be manufactured more efficiently.

Disclosure of the Invention

The main points of the present invention are described below with reference to the accompanying drawings.

A first aspect of the present invention relates to a method for manufacturing a shaft in which linking members 11 are provided at end parts of a cylindrical member 10, said method characterized by comprising:
- a preparation step for preparing the cylindrical member 10, in which male threaded portions 5 are formed at the end parts;
- a screwing step in which the linking members 11, which have female threaded portions 6 to be screwed onto the male threaded portions 5, are screwed onto the male threaded portions 5; and
- a diffusion-joining step in which opposing end surfaces of the linking members 11 and the cylindrical member 10 are heated in a state of being pressed against each other by the tightening produced by the screwed-on linking members 11, and the opposing end surfaces are diffusion-joined.

A second aspect of the present invention relates to the method for manufacturing a shaft according to the first aspect, said method characterized in that opposing end parts of each of a first half tube 1 and a second half tube 2 are brought to face each other, whereby the cylindrical member 10 is imparted with a cylindrical form.

A third aspect of the present invention relates to the method for manufacturing a shaft according to the second aspect, said method characterized in that the diffusion-joining step includes a step for diffusion-joining the opposing end parts of the first half tube 1 and the second half tube 2 together.

A fourth aspect of the present invention relates to the method for manufacturing a shaft according to the third aspect, said method characterized in that in the diffusion-joining step, due to the tightening produced by the linking members 11, heating is performed in a state where the opposing end surfaces of the linking members 11 and the cylindrical member 10 are pressed against each other and in a state where the opposing end parts of the first half tube 1 and the second half tube 2 are pressed against each other, the opposing end surfaces of the linking members 11 and the cylindrical member 10 being diffusion-joined and the opposing end parts of the first half tube 1 and the second half tube 2 being diffusion-joined.

A fifth aspect of the present invention relates to the method for manufacturing a shaft according to any of the second through fourth aspects, said method characterized in that first engagement parts 3 are provided to the opposing end parts of the first half tube 1, and second engagement parts 4 that engage with the first engagement parts 3 are provided to the opposing end parts of the second half tube 2.

Effect of the Invention

Due to having the configuration described above, the present invention provides an unprecedented method for manufacturing a shaft, whereby a hollow shaft in which linking members are joined at both ends of a cylindrical member can be manufactured more efficiently.

BEST MODE FOR CARRYING OUT THE INVENTION

Figure 1:
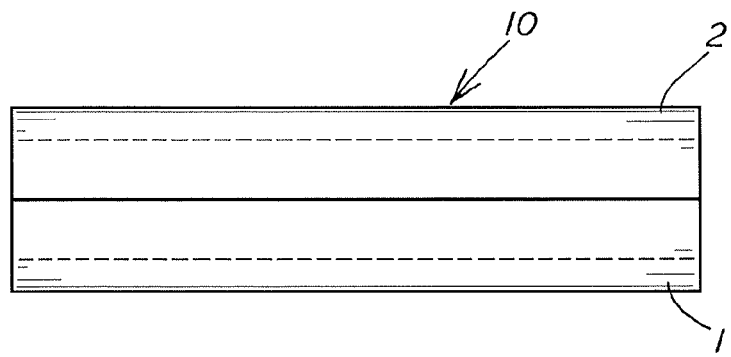
FIGS. 1 (*a*) to 1 (*c*) are schematic explanatory diagrams of the steps of the present example.
Figure 1:
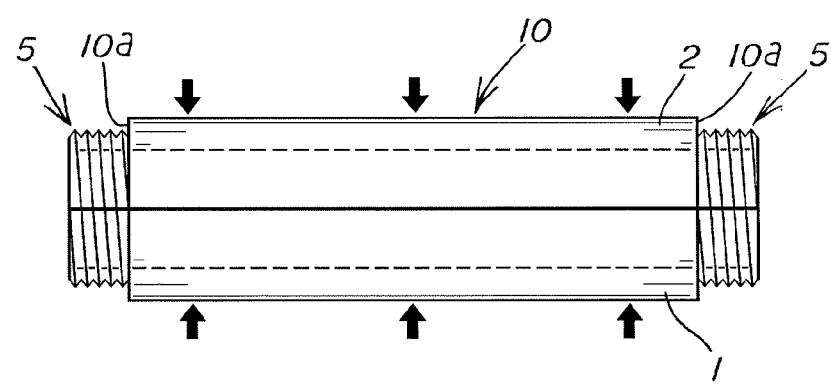
Figure 1:
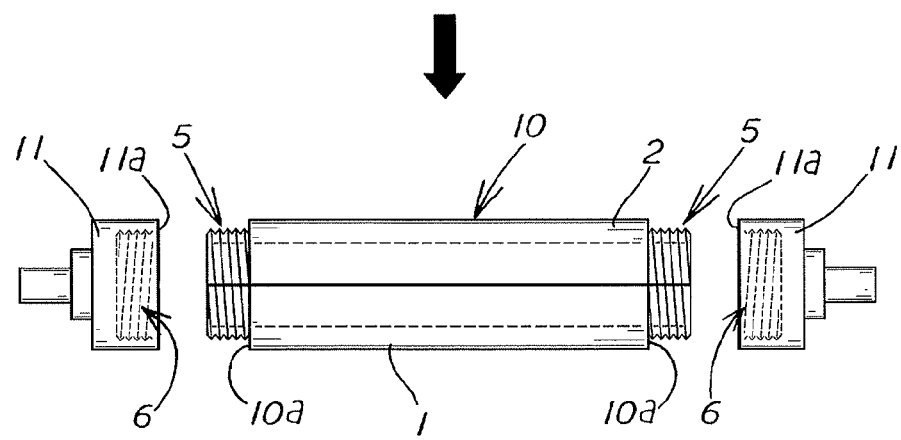

Preferred embodiments of the present invention are straightfowardly described on the basis of the drawings while indicating the effects of the present invention.

Male threaded portions 5 are formed at the ends of a cylindrical member 10, and female threaded portions 6 of linking members 11 are screwed onto the male threaded portions 5 whereby the linking members 11 are provided at the ends of the cylindrical member 10.

The cylindrical member 10 is turned so that opposing end surfaces of the cylindrical member 10 and the linking members 11 are pressed together, and due to the tightening action achieved via the linking members 11, the opposing end surfaces of the linking members 11 and the cylindrical member 10 are diffusion-joined in such a state that the opposing end surfaces are pressed together.

Specifically, without separately using a jig, etc., for creating a state in which the linking members 11 are pressed against the ends of the cylindrical member 10, the linking members 11 can be pressed against and diffusion-joined to the cylindrical member 10 by being turned, which makes it possible to manufacture a shaft easily and efficiently.

In cases in which, for example, semispherical first and second half tubes 1, 2 are brought to face each other to create a cylindrical member and this member is employed as the cylindrical member 10, a cylindrical shape can be maintained in a state in which the opposing end parts of the first half tube 1 and the second half tube 2 are pressed together by the linking members 11. Moreover, when the opposing end surfaces of the linking members 11 and the cylindrical member 10 are to be diffusion-joined, the opposing end parts of the first half tube 1 and the second half tube 2 can be diffusion-joined simultaneously.

EXAMPLES

Specific examples of the present invention shall be described with reference to the drawings.

The present example is a method for manufacturing a shaft in which metal linking members 11 provided with gears, splines, or other engagement parts are provided at the ends of a cylindrical member 10.

Specifically, this method includes a preparation step of preparing a cylindrical member 10 having male threaded portions 5 formed at the ends, a screwing step in which the linking members 11, which have female threaded portions 6 to be screwed onto the male threaded portions 5, are screwed onto the male threaded portions 5, and a diffusion-joining step in which opposing end surfaces of the linking members 11 and the cylindrical member 10 are diffusion-joined in a state where the opposing end surfaces are pressed together by a tightening action achieved using the screwed linking members 11.

For the cylindrical member 10, an existing pipe member (cylindrical member) may be used, or a cylindrical member created by bringing the semi-cylindrical first half tube 1 and second half tube 2 to face each other may be used. In the present example, a member composed of the first half tube 1 and the second half tube 2 is used.

The first half tube 1 and the second half tube 2 do not necessarily have to be joined into an integrated body before the screwing step. Specifically, the first half tube 1 and the second half tube 2 may be joined in the diffusion-joining step, as shall be described hereinafter.

The first half tube 1 and the second half tube 2 of the present example are semi-cylindrical members made of, for example, high-tensile steel, stainless steel, a titanium alloy, or another metal, and are obtained by essentially dividing a cylindrical member into two parts. The half cylinders 1, 2 have the same shape except for the shapes of the first engagement parts 3 and the second engagement parts 4. The first half tube 1 and the second half tube 2 may be of the same metal material or different metal materials.

Figure 3:
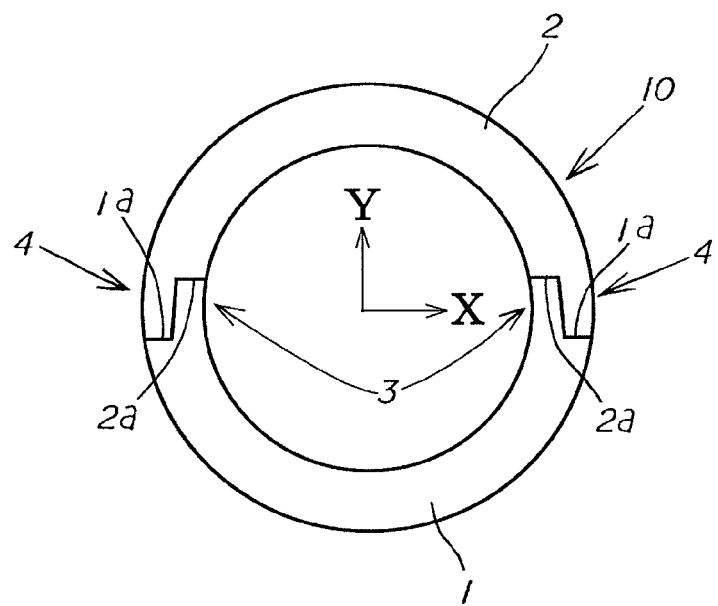
FIG. 3 is a schematic explanatory end surface diagram of a cylindrical member 10.
Figure 4:
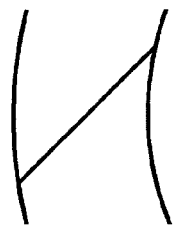
FIGS. 4 (*a*) to 4 (*r*) show examples of shapes of first engagement parts 3 and second engagement parts 4.
Figure 4:
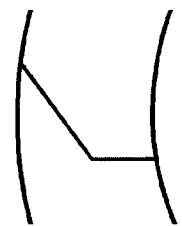
Figure 4:
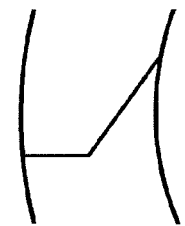
Figure 4:
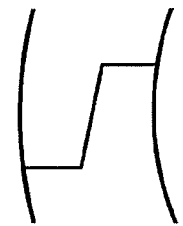
Figure 4:
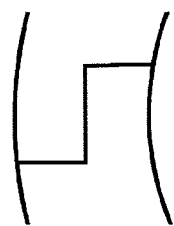
Figure 4:
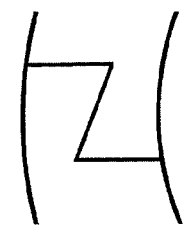
Figure 4:
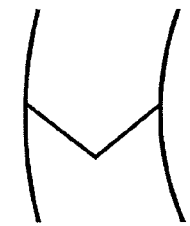
Figure 4:
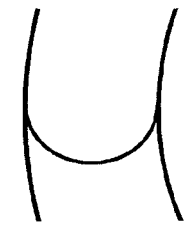
Figure 4:
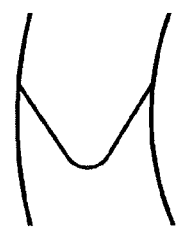
Figure 4:
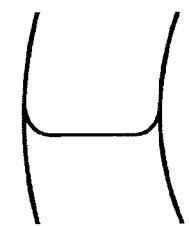
Figure 4:
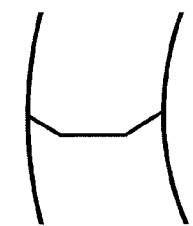
Figure 4:
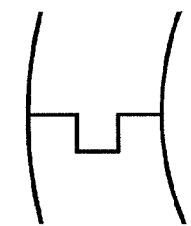
Figure 4:
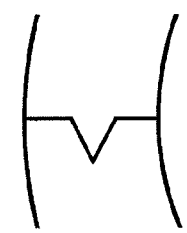
Figure 4:
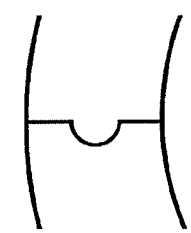
Figure 4:
Figure 4:
Figure 4:
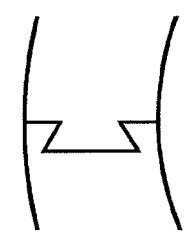
Figure 4:
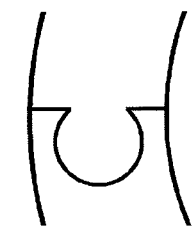

In the present example, as shown in FIG. 3, the first engagement parts 3 are provided at both of the opposing end parts of the first half tube 1, and the second engagement parts 4, which engage with the first engagement parts 3, are provided at both of the opposing end parts of the second half tube 2. The first engagement parts 3 and the second engagement parts 4 engage, whereby radial displacement therebetween is prevented and the cylindrical shape is maintained. The shapes of the first engagement parts 3 and the second engagement parts 4 can be set as appropriate provided that the shapes are mating recesses and protrusions.

The surface roughness (Ra) of overlapping surfaces 1a, 2a of the first half tube 1 and second half tube 2 (the surfaces of the first engagement parts 3 and second engagement parts 4 that come into contact with each other) is preferably about 0.4-1.6. This is because, at a surface roughness less than 0.4, a dramatic improvement in the joining quality cannot be expected in consideration of the high machining difficulty, while at a surface roughness greater than 1.6, joining quality will decrease.

The linking members 11 are formed by hollowing out a workpiece using cold or hot forging such that the diameter gradually decreases toward the outer sides, and then forming gears or splines on the outer surfaces by machining (cutting, bobbing, spline rolling, etc.). The surfaces that make pressurized contact with the cylindrical member 10 are formed by cutting.

The present example is preferably configured so as to minimize misalignment in direction Y, which is orthogonal to direction X in which the first half tube 1 and the second half tube 2 oppose each other, and is configured so that movement in the X direction is impeded when the tubes are in an engaged state (various shapes are considered; e.g., any of those in FIGS. 4(a) to (e) and (g) to (p), which are enlargements of a first engagement part 3 and a second engagement part 4. FIG. 3 corresponds to (d)). For example, a shape may be adopted so as to prevent dislodgement in the X direction, such as in FIGS. 4(f), (q), and (r) (configurations in which the cylindrical shape can be retained without the use of a jig even if both sets of engagement parts are not joined together in a state of being engaged). The overlapping surfaces can be wide in the shapes of (d) to (f) (in a "Z" shape or reverse-"Z" shape), which alone is sufficient for satisfactory diffusion-joining.

Shapes that enable anti-dislodgment engaging such that the engagement parts will not be dislodged in the X direction may be configured such that the overlapping surfaces of the first engagement parts 3 and the second engagement parts 4, which are the diffusion-joining surfaces, can be in a state of being pressed together via the elasticity of the first half tube 1 or the second half tube 2.

The manufacturing steps shall now be described in detail.

The first half tube 1 in which the first engagement parts 3 are formed is made into a half cylinder, and the second half tube 2 in which the second engagement parts 4 that meet the first engagement parts 3 are formed is made into a half cylinder.

The first engagement parts 3 and the second engagement parts 4 of the first half tube 1 and the second half tube 2 are caused to engage so as to form a cylindrical shape, and, with the cylindrical shape of the cylindrical member 10 (the first half tube 1 and the second half tube 2) retained by an appropriate jig (FIG. 1(a)), the male threaded portions 5 are formed (FIG. 1(b)) by machining screw threads into both ends of the cylindrical member 10, and a cylindrical member 10 having male threaded portions 5 formed at both ends is obtained (preparation step).

Outward-facing surfaces 10a formed in outer peripheral portions when the male threaded portions 5 are formed and end surfaces 11a present in outer peripheries of open parts in the female threaded portions 6 of the linking members 11 constitute opposing end surfaces of the cylindrical member 10 and the linking members 11.

In addition, the pair of linking members 11, in which the female threaded portions 6 to be screwed onto the male threaded portions 5 are formed on the inner peripheral surfaces, are prepared while the preparation step is performed (FIG. 1(c)).

Figure 2:
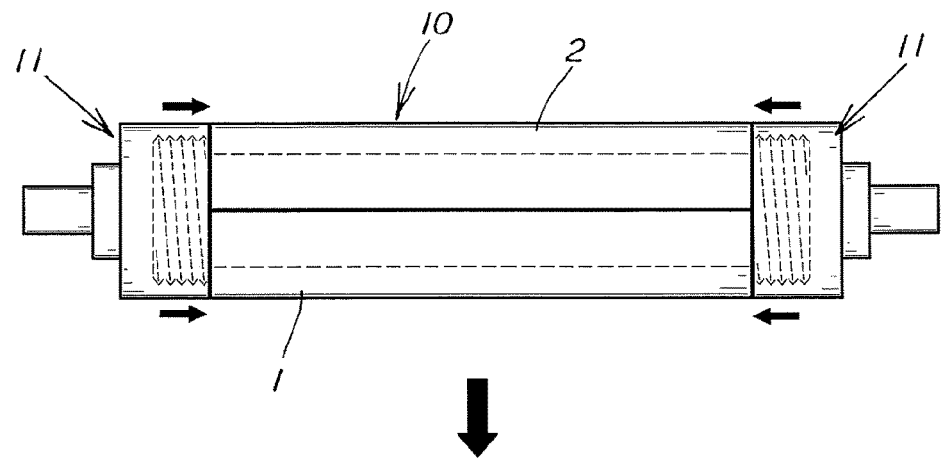
FIGS. 2 (*d*) to 2 (*f*) are schematic explanatory diagrams of the steps of the present example.
Figure 2:
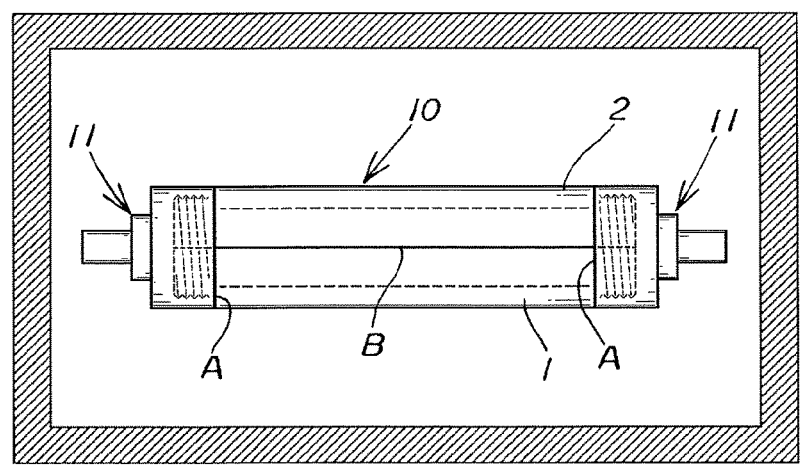
Figure 2:
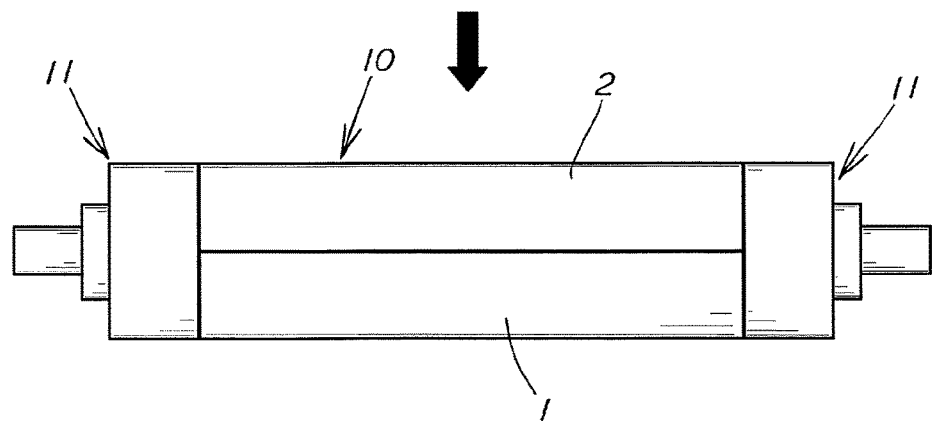

Subsequently, the linking members 11 are screwed onto both ends of the cylindrical member 10 (screwing step; FIG. 2 (d)). The degree of tightening via the linking members 11 is adjusted as appropriate, and the degree of contact (surface pressure) between the opposing end surfaces of the cylindrical member 10 and the linking members 11 is adjusted. For example, surface pressure can be managed or adjusted according to tightening torque (for example, about 50-100 N·m).

The cylindrical member 10 and the linking members 11 are then introduced into a heating furnace in a state where the opposing end surfaces are pressed against each other at a predetermined pressure, and, with the interior of the heating furnace having been set to a vacuum atmosphere or inert atmosphere, the opposing end surfaces are heated and diffusion-joined (diffusion-joining step; FIG. 2(e)). For example, diffusion-joining is performed by heating the inside at about 900-1000° C. in a vacuum atmosphere of about $10^{-6}$ to $10^{-3}$ Pa, and maintaining these conditions for a predetermined time (several dozen minutes to several hours).

Specifically, due to the tightening via the linking members 11, heating is performed in a state where the opposing end surfaces of the linking members 11 and the cylindrical member 10 are pressed against each other and a state where the opposing end parts of the first half tube 1 and the second half tube 2 are pressed against each other, the opposing end surfaces A of the linking members 11 and the cylindrical member 10 being diffusion-joined, and the opposing end parts B of the first half tube 1 and the second half tube 2 being diffusion-joined.

During this process, the cylindrical shape of the cylindrical members, the first half tube 1 and the second half tube 2, is maintained by the linking members 11, and by setting, e.g., the diameters of the male threaded portions 5 and the female threaded portions 6 as appropriate, a state can be established in which the opposing end parts of the first half tube 1 and the second half tube 2 are pressed against each other at a predetermined pressure. Therefore, the state of contact (state of pressing) between the first engagement parts 3 and the second engagement parts 4 is maintained by screwing the linking members 11 onto both ends of the cylindrical member 10, and the first half tube 1 and the second half tube 2 can also be diffusion-joined at the same time.

After the diffusion-joining step, the members are cooled to a temperature of, for example, about 200° C., and then taken out of the heating furnace to yield a shaft in which linking members 11 are provided at both ends of a cylindrical member 10 (FIG. 2(f)).

The obtained shaft can be used in, inter alia, a shaft for an electric-vehicle (EV) motor.

After the diffusion-joining step, cutting, polishing, and other types of finishing (exterior finishing step) may be performed in order to remove, inter alia, any irregularities on outer-surface sides of the linking parts between the cylindrical member 10 and the linking members 11. Furthermore, after the diffusion-joining step, cutting, polishing, and other types of finishing (interior finishing step) for removing, inter alia, any irregularities in inner-surface sides of the opposing end parts of the cylindrical member 10 may be performed.

In the present example, given what has been described above, the male threaded portions 5 are formed at both ends of the cylindrical member 10 and the female threaded portions 6 of the linking members 11 are screwed onto the male threaded portions 5, whereby the linking members 11 are provided to the ends of the cylindrical member 10, the cylindrical member 10 is turned so that the opposing end surfaces of the cylindrical member 10 and the linking members 11 are pressed against each other, and by tightening via the linking members 11, the opposing end surfaces of the linking members 11 and the cylindrical member 10 can be diffusion-joined in a state where the opposing end surfaces are pressed against each other.

Specifically, without separately using a jig, etc., for creating a state in which the linking members 11 are pressed against the ends of the cylindrical member 10, the linking members 11 can be pressed against and diffusion-joined to the cylindrical member 10 by being turned, which makes it possible to manufacture a shaft easily and efficiently.

As was described in the background art, friction welding may be used when joining the linking members 11 to the ends of the cylindrical member 10; however, with friction welding, no procedure exists for detecting defects in individual products in a mass production process, and it is typically difficult to guarantee quality.

In this respect, in the present invention, the linking members 11 are screwed onto the ends of the cylindrical member 10, and by tightening via the linking members 11, the opposing end surfaces of the linking members 11 and the cylindrical member 10 are heated while being pressed and the opposing end surfaces are diffusion-joined together. Diffusion-joining strength is thereby imparted in addition to screwing strength, making it easy to guarantee quality in the joined parts.

Even if the semicylindrical first half tube 1 and second half tube 2 are brought to face each other to produce cylindrical member, and the cylindrical member is used as the cylindrical member 10, the cylindrical shape can be maintained in a state where the opposing end parts of the first half tube 1 and second half tube 2 are pressed against each other by the linking members 11. Moreover, when the opposing end surfaces of the linking members 11 and the cylindrical member 10 are diffusion-joined to each other, the opposing end parts of the first half tube 1 and the second half tube 2 can be diffusion-joined simultaneously.

Therefore, the cylindrical member 10 is not limited to being an existing pipe member; any discretionary member can be used. A broader range of members can be selected, and, furthermore, fewer man-hours are needed than when semicylindrical members are joined together in advance.

Thus, the present example is an unprecedented method for manufacturing a shaft, whereby a hollow shaft in which linking members are joined at both ends of a cylindrical member can be manufactured more efficiently.

REFERENCE SIGNS LIST

1 First half tube
2 Second half tube
3 First engagement part
4 Second engagement part
5 Male threaded portion
6 Female threaded portion
10 Cylindrical member
11 Linking member

The invention claimed is:
1. A method for manufacturing a shaft in which linking members are provided at ends of a cylindrical member, said method characterized by comprising:

a preparation step for preparing a cylindrical member having male threaded portions formed at the ends, the cylindrical member being imparted with a cylindrical form by bringing opposing end parts of each of a first half tube and a second half tube to face each other;

a screwing step in which linking members, which have female threaded portions to be screwed onto the male threaded portions, are screwed onto the male threaded portions; and a diffusion-joining step in which during the tightening produced by the screwed-on linking members, heating is performed in a state where the opposing end surfaces of the linking members and the cylindrical member are pressed against each other and in a state where the opposing end parts of the first half tube and the second half tube are pressed against each other, the opposing end surfaces of the linking members and the cylindrical member being diffusion-joined and the opposing end parts of the first half tube and the second half tube being diffusion-joined.

2. The method for manufacturing a shaft according to claim 1, characterized in that first engagement parts are provided to the opposing end parts of the first half tube, and second engagement parts that engage with the first engagement parts are provided to the opposing end parts of the second half tube.

* * * * *